Patented July 8, 1941

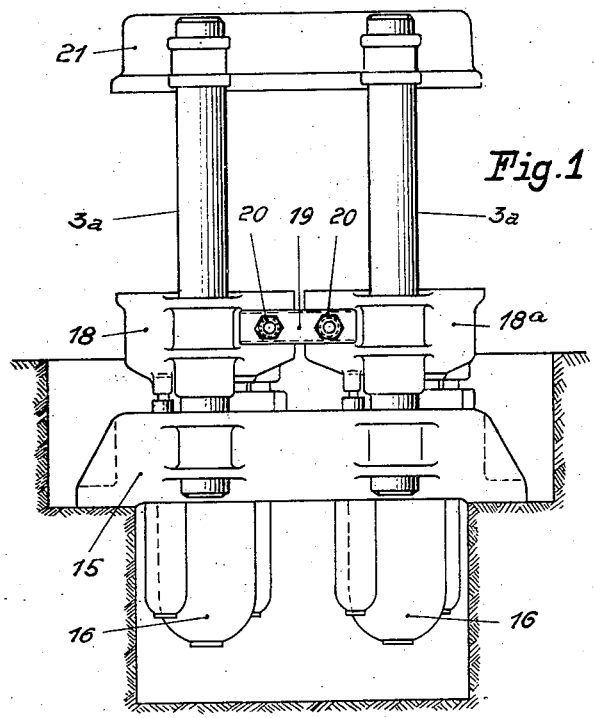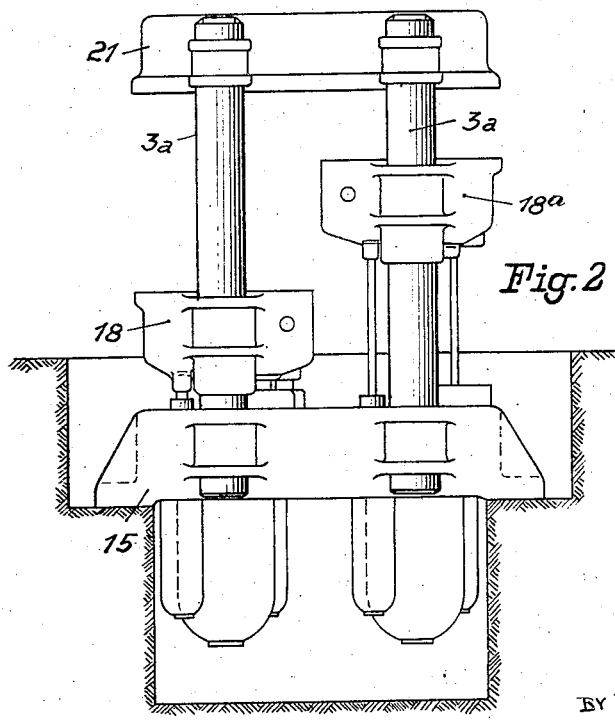

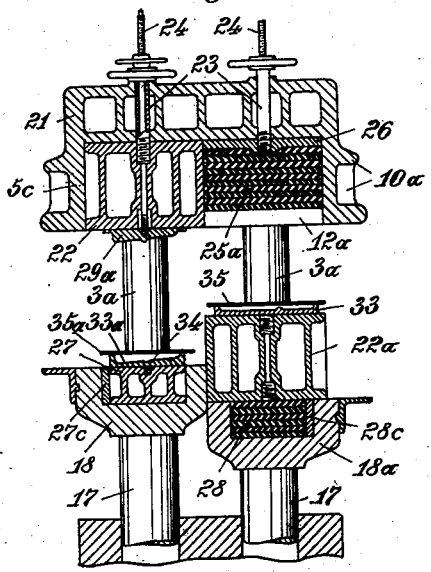
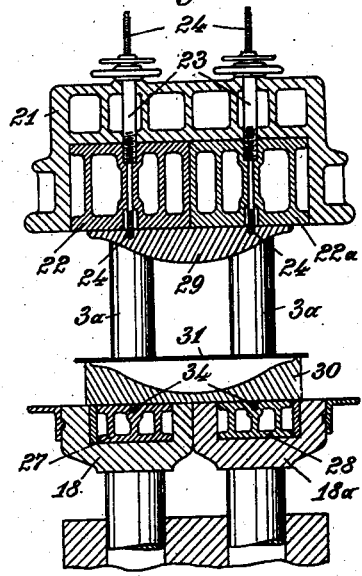
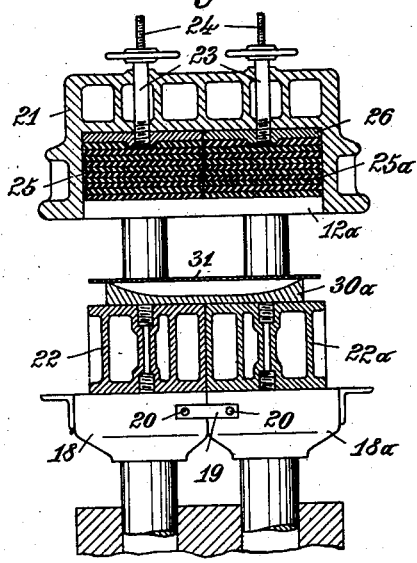
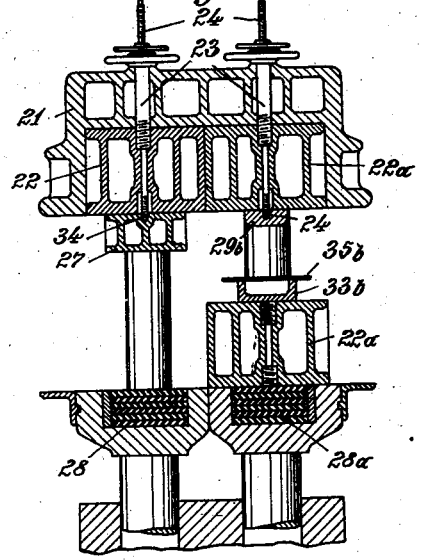

2,248,186

UNITED STATES PATENT OFFICE 2,248,186

PRESSING APPARATUS

Otto Oeckl, Berlin-Schoneberg, Germany, assignor to the firm Henschel Flugzeug-Werke Aktiengesellschaft, Schonefeld, Kreis Teltow, Germany Original application October 11, 1938, Serial No. 234,455. Divided and this application July 21, 1939, Serial No. 285,786. In Germany February 22, 1937

8 Claims. (Cl. 113—38)

This application is a divisional of my copending application Serial No. 234,455, filed October 11, 1938.

The invention relates to the production of sheet metal pressings, and a general object of the invention is to provide a novel press intended more especially for the production of deep and complicated pressings in a sharply defined and faultless manner.

According to the invention a high pressure press may be constructed such that articles of different sizes can be produced with the aid of rigid material or elastic yielding material, whilst economical utilisation of this yielding material is ensured.

With this object in view, the press comprises two press parts movable towards and away from one another, one of which contains a chamber open towards the other press part and arranged for the temporary reception of one or more exchangeable filling pieces or inserts of equal or unequal size of unyielding material, which, singly or together, are interchangeable with inserts of corresponding size of elastic yieldable material. According to the size of the sheet metal parts to be produced or the size of the matrix or moulding piece which is to be used, the inserts are singly or together used for the pressing operation. For example, if instead of large pieces only small pieces are to be pressed by means of rubber, inserts of the elastic yieldable material are left in the chamber, whilst the remaining space in the chamber is filled out with the unyielding filling pieces or inserts. An exactly fitting counterpart of unyielding material works together with the insert of elastic yielding material used at each time. The rigid counterpart is preferably formed by the insert that has been replaced by the yielding insert. The filling pieces of rigid material form limiting walls for the elastic yieldable insert piece or insert pieces of the necessary size and render powerful moulding possible.

The counterpart or its carrier, consisting for example of the press table, may be sub-divided so that the table parts can be used separately or together, whilst there are provided separate controls which can be coupled, the table parts then being rigidly coupled together by suitable devices for this purpose and capable of being driven jointly. The high pressure press can also be used for pressing with the aid of swages, if the firm filling pieces are correspondingly provided with the matrix or patrix.

The press table may be constructed as hollow bodies and may be provided with exchangeable filling or insert pieces of unyieldable material in order for instance to be able to arrange a pressure cushion of rubber also in the table.

The invention, which is susceptible of realisation in various embodiments, includes the following features:

(1) The use in at least one of the press parts of elastic yieldable solid material, such as rubber, with a diameter that preferably at the most is 5 times and on the average is 2.5 times its height, whereby pressures of at least 80 kg./cm.² can be employed;

(2) The provision, in order that the elastic yieldable material may sustain the pressures employed, of means for preventing said material being pressed away outwardly over its lateral boundary and over the side opposite to the press surface;

(3) A method in which the actual pressing out of the sheet metal is performed at only a low speed.

Further features and objects of the invention will be more apparent to those skilled in the art from a consideration of the following disclosure of a number of embodiments illustrated in the accompanying drawings, in which:

Fig. 1 illustrates in side elevation a high pressure press with the parts of a sub-divided press table rigidly connected together;

Fig. 2 illustrates the same press with the table parts separated; and

Fig. 3 is a cross-section of the table and counterpart of the press and indicates various uses of the press.

Figs. 4, 5 and 6 diagrammatically illustrate the press in section and indicate further uses thereof.

Referring to the drawings, on the press base 15 are provided two pressure cylinders 16 with pistons 17 for the two-part movable press table 18, 18a. The two table parts 18, 18a may be rigidly connected together, for instance, by means of straps 19 and screw bolts 20 (Fig. 1). In this case, the respective distributing device for the pressure cylinders 16 may be coupled together and operated from a common control; also a common pressure medium line may be provided for both cylinders 16.

The columns 3a for guiding the table parts carry at their upper ends a crosshead 21 which is constructed as a hollow body comprising the chamber 12a, the side walls 5c of which are reinforced by webs and flanges 10a. The chamber is so large that it can be packed with two or more bodies with sufficient working surface.

As shown in Fig. 4, the chamber 12a contains two filling pieces 22, 22a of rigid material, each of which is secured in the crosshead 21 by means of a screw spindle 23. The latter may be constructed as a screw bushing and then carry a screw spindle 24 for securing a swage 29 on the filling piece 22. With a press arranged in the manner described it is possible to press hard on hard, either by jointly moving up the two previously coupled table parts 18, 18a or by driving each part 18, 18a separately. In Fig. 4 the first possibility is assumed. Opposite the upper die 29 the table 18, 18a is provided with a lower die 30 on which a large work 31 to be formed is placed. Smaller pieces are pressed by making use of the individual parts 18, 22 or 18a, 22a of the press and arranging the respective dies separately on the table parts 18, 18a below and securing them on top to the spindles 24. Such an arrangement will permit doubling of the output.

The press may of course be used also in the manner indicated in Fig. 3 by removing from the chamber 12a one of the rigid inserts 22, 22a and replacing it by an insert 25a of elastic yieldable solid material, e. g. rubber, which may be composed of individual plates. This insert is exchangeably secured in the crosshead 21, for instance, by means of a plate 26 and the screw spindle or bushing 23.

The removed rigid insert 22a is placed on the table part 18a and serves as rigid counterpart which coacts with the rubber cushion 25a which fits into the chamber space 12a that is not filled by the rigid body 22. 33 is a matrix disposed on the insert 22a, and 35 is a work piece, still in flat condition, to be deformed in the rubber body acting as patrix.

The table parts 18, 18a can be separately moved so as to permit pressing hard against a yielding resistance in one-half of the press and hard upon hard in the other. In the left half of the press a matrix 29a is secured to the insert 22 by means of a spindle 24, and on the table 18 the patrix 33a with the sheet metal piece 35a to be deformed is positioned. The coupled drive of the two press halves 18, 18a makes it possible, when the same driving pressure is employed, to double the amount of pressure applied by pressing only between 18 and 22 or between 18a and 25a at a time. This applies also to the arrangement shown in Fig. 4.

The sizes of the rigid filling piece 22 and the cushion insert 25 are such that the latter provides the press surface required for the production of a given pressed article, whilst the remaining space of the chamber is filled up by one or more of the filling pieces 22.

The inserts 22, 22a and 25a are of equal size so as to be interchangeable. The lower face of the members 25a is somewhat set back relative to the under surface of the crosshead 21, so that the yielding material is compressed only when the rigid insert 22a has entered the chamber 12a to a certain depth.

It is recommended to give to the elastic cushion a resistant pressure surface, which is attainable, for instance, by using plates of soft and hard caoutchouc.

As shown in Fig. 5, the chamber 12a may be filled only with inserts 25, 25a of elastic yieldable material, whilst the rigid filling pieces 22, 22a are disposed on the table parts 18, 18a. This method is chosen when large molded bodies 31 are to be produced by pressing with the aid of rubber, etc., the table parts 18, 18a supporting the matrix 30a being then coupled and jointly driven.

The filling pieces 22 can also be utilised for raising the pressure surface of the press table if the execution of the whole stroke of the table is not necessary for the pressing operation. The shorter working path of the press leads to a quicker method of working.

In accordance with a further feature of the invention the press table parts 18, 18a are preferably made hollow and packed out with one or more filling pieces 27, 27c of rigid material, which advantageously are exchangeable for inserts 28 (or 28a) and 28c of elastic yieldable solid material, e. g. rubber (Fig. 3), and of rigid material, respectively.

Fig. 6 shows for instance how a rigid insert 27 is arranged under a rigid insert 22 and held there by means of the screw spindle 24 which with its lower threaded end is screwed into a threaded bore 34 of the insert 27. It is therefore possible to deform the work pieces to be produced also in the press table parts with the aid of the rubber cushions. Fig. 6 further indicates the possibility of raising, as it were, the press table surface by means of the rigid inserts 22a so as to shorten the pressure stroke between the matrix 29b and the patrix 33b for deforming the work piece 35b.

The insertions 22, 22a or 25, 25a on the one hand 27, 27c or 28, 28c on the other are of different size. The table inserts are, as a rule, chosen smaller than those of the cross head. Owing to the employment of table inserts, the pressing members can be adapted still more to the size of the molded pieces to be produced. It is of course also possible to deform between two inserts 27.

By means of filling pieces, as 27c, 28c, extending to the working surface, the inserts may be completed up to the normal size required for insertion.

The invention has the advantage of an increased economy in rubber, because this relatively expensive material rapidly wears out, particularly in the manufacture of deeply hollowed articles, and now for small articles only correspondingly small rubber inserts need be used. Thereby, with the same press large, and in particular flat, work pieces may be pressed, if the small inserts are replaced by those of larger working surface.

A further advantage of the invention is that by adapting the size of the working surface to the size of the work piece, the whole pressure of the press operates only on the work piece, and this leads to particularly sharp stamping with a foldless edge.

Further, the sub-division of the movable press parts (press table) leads, on pressing small work pieces, to a reduction in the dead weight to be moved and thus to an economical method of working.

I claim:

1. A press for the production of sheet metal stampings comprising two press parts movable towards and away from one another, one of said press parts containing a chamber open towards the other of said press parts, a plurality of press bodies adapted for separate and interchangeable insertion in said chamber, some of said press bodies consisting of elastic yielding material and the other bodies of rigid material, said chamber being of a size to receive and to be filled by at least two of said bodies disposed therein in side by side relationship, means for securing two of said bodies in side by side relationship in said chamber, and a rigid counterpart adapted to be carried by the other press part for cooperation with at least one of two press bodies secured in said chamber, the arrangement being such that hard-on-yielding pressing operations may be effected either between two press bodies of yielding material disposed in said chamber and said rigid counterpart or between one body of yielding material which together with a second body filling the chamber is disposed therein and said rigid counterpart, and that hard-on-hard pressing operations may be effected either between two press bodies of rigid material disposed in said chamber and said rigid counterpart or between one body of rigid material which together with a second body filling the chamber is disposed therein and said rigid counterpart.

2. A press as set forth in claim 1, wherein the press bodies of rigid material are adapted, separately and one with another, to form at least partly the rigid counterpart.

3. A press as set forth in claim 1, wherein the press bodies of rigid material are each provided with means for attaching a swage thereto.

4. A press as set forth in claim 1, wherein said other press part has at least one depression open towards the chamber and which is substantially smaller than said chamber, a plurality of inserts adapted for separate and interchangeable insertion into said depression, some of said inserts consisting of elastic yielding material and the other inserts of rigid material, at least one of said inserts of rigid material being adapted, for an additional hard-on-yielding pressing operation, to be secured to a press body of rigid material disposed in said chamber for cooperation with an insert of yielding material disposed in said depression.

5. A press for the production a sheet metal stampings comprising two vertically related press parts, one of said press parts being stationary and containing a chamber open toward the other of said press parts, a plurality of press bodies adapted for separate and interchangeable insertion in said chamber, some of said press bodies consisting of elastic yielding material and the other bodies of rigid material, said chamber being of a size to receive and to be filled by at least two of said bodies disposed therein in side by side relationship, means for securing two of said bodies in side by side relationship in said chamber, the other press part being movable towards and away from the first press part and being divided into two sections along substantially a plane of division which includes the contact plane of two press bodies secured in the chamber, each section being adapted to carry a rigid counterpart for cooperation with a press body in said chamber, and means for actuating said sections independently or in unison, the arrangement being such that hard-on-yielding pressing operations may be effected either between two press bodies of yielding material disposed in said chamber and two rigid counterparts disposed on and movable in unison with said sections or between one body of yielding material which together with a second filling body is disposed in said chamber and one rigid counterpart disposed on and movable with one of said sections, and that hard-on-hard pressing operations may be effected either between two press bodies of rigid material disposed in said chamber and two rigid counterparts disposed as aforesaid or between one body of rigid material which together with a second body filling the chamber is disposed therein and one rigid counterpart disposed as aforesaid.

6. A press as set forth in claim 5, wherein the press bodies of rigid material are each adapted to form a rigid counterpart.

7. A press as set forth in claim 5, wherein the press bodies of rigid material are each provided with means for attaching a swage thereto.

8. A press as set forth in claim 5, wherein at least one of said sections has a depression which opens toward the chamber and is substantially smaller than said chamber, a plurality of inserts adapted for separate and interchangeable insertion into said depression, some of said inserts consisting of elastic material and the other inserts of rigid material, at least one of said inserts of rigid material being adapted, for an additional hard-on-yielding pressing operation, to be secured to a press body of rigid material disposed in said chamber for cooperation with an insert of yielding material disposed in said depression.

OTTO OECKL.